United States Patent [19]
Gordon

[11] Patent Number: 5,818,897
[45] Date of Patent: *Oct. 6, 1998

[54] QUADRATURE TRANSVERSE CT DETECTION SYSTEM

[75] Inventor: Bernard M. Gordon, Manchester-by-the-Sea, Mass.

[73] Assignee: Analogic Corporation, Peabody, Mass.

[ * ] Notice: This patent issued on a continued prosecution application filed under 37 CFR 1.53(d), and is subject to the twenty year patent term provisions of 35 U.S.C. 154(a)(2).

[21] Appl. No.: 918,952

[22] Filed: Aug. 26, 1997

Related U.S. Application Data

[63] Continuation of Ser. No. 671,716, Jun. 27, 1996, abandoned.

[51] Int. Cl.$^6$ .................................................. G01N 23/00
[52] U.S. Cl. .................................................. 378/19; 378/4
[58] Field of Search .............................. 378/4, 8, 15, 19, 378/20, 57

[56] References Cited

U.S. PATENT DOCUMENTS

| | | |
|---|---|---|
| 4,759,047 | 7/1988 | Donges et al. . |
| 4,884,289 | 11/1989 | Glockman et al. . |
| 5,125,015 | 6/1992 | Shimoni et al. ........................... 378/51 |
| 5,132,998 | 7/1992 | Tsutsui et al. . |
| 5,182,764 | 1/1993 | Peschmann et al. . |
| 5,247,561 | 9/1993 | Kotowski . |
| 5,262,946 | 11/1993 | Heuscher . |
| 5,291,402 | 3/1994 | Pfoh ..................................... 364/413.14 |
| 5,293,416 | 3/1994 | Pfeiler et al. .......................... 378/19 X |
| 5,319,547 | 6/1994 | Krug et al. . |
| 5,355,309 | 10/1994 | Eberhard et al. ...................... 378/19 X |
| 5,367,552 | 11/1994 | Peschmann . |
| 5,390,226 | 2/1995 | Tam ........................................ 378/19 |
| 5,490,218 | 2/1996 | Krug et al. . |
| 5,510,622 | 4/1996 | Hu et al. . |
| 5,600,700 | 2/1997 | Krug et al. ............................. 378/57 |
| 5,642,393 | 6/1997 | Krug et al. ............................. 378/57 |

FOREIGN PATENT DOCUMENTS

| | | |
|---|---|---|
| 31 503 06 A1 | 6/1983 | Germany . |
| WO 96/13017 | 5/1996 | WIPO . |

OTHER PUBLICATIONS

Alvarez et al. (1976) *Phys. Med. Biol.* 21:733–744.

*Primary Examiner*—David P. Porta
*Attorney, Agent, or Firm*—Lappin & Kusmer

[57] ABSTRACT

The disclosed detector system includes a two dimensional array of detectors for use in generating a volumetric scan of objects moving through a scanner. The array can comprise rows and columns of square detectors, or alternatively at least two types of detectors, one for providing high image resolution in a direction parallel to or within a plane containing the X- and Y-axes of a CT scanner, and the other for providing high image resolution e direction of the Z-axis of the scanner. Preferably, a first set of detectors is oriented in one direction and a second set of detectors is oriented in a different direction. The disclosed detector system may be used in connection with CT scanners and, in particular, with CT baggage scanners and is particularly useful for detecting the presence of thin objects such as sheet explosives within scanned baggage. An improved method of scanning baggage is provided by using the one set of detectors to generate CT image information and the other set of detectors to generate at least one sinogram.

33 Claims, 7 Drawing Sheets

QUADRATURE TRANSVERSE CT DETECTION SYSTEM

This is a continuation of application Ser. No. 08/671,716 filed on Jun. 27, 1996 now abandoned.

CROSS-REFERENCE TO RELATED APPLICATIONS

This application is related to U.S. patent application Ser. No. 08/671,202 entitled IMPROVED DUAL ENERGY POWER SUPPLY, assigned to the present assignee, and filed concurrently with the present application, which is hereby incorporated by reference.

1. Field of the Invention

The present invention relates generally to Computed Tomography (CT) scanners. More particularly, the invention relates to an improved detector array useful in connection with a CT baggage scanner for providing improved detection of sheet explosives and the like.

2. Background of the Invention

Various X-ray baggage scanning systems are known for detecting the presence of explosives and other prohibited items in baggage, or luggage, prior to loading the baggage onto a commercial aircraft. Since many explosive materials may be characterized by a range of densities differentiable from that of other items typically found in baggage, explosives are generally amenable to detection by X-ray equipment. Most X-ray baggage scanning systems in use today are of the "line scanner" type and include a stationary X-ray source, a stationary linear detector array, and a conveyor belt for transporting baggage between the source and detector array as the baggage passes through the scanner. The X-ray source generates an X-ray beam that passes through and is partially attenuated by the baggage and is then received by the detector array. During each measuring interval the detector array generates data representative of the integral of density of the planar segment of the baggage through which the X-ray beam passes, and this data is used to form one or more raster lines of a two dimensional image. As the conveyor belt transports the baggage past the stationary source and detector array, the scanner generates a two dimensional image representative of the density of the baggage, as viewed by the stationary detector array. The density image is typically displayed for analysis by a human operator.

Plastic explosives present a particular challenge to baggage scanning systems because, due to their moldable nature, plastic explosives may be formed into geometric shapes that are difficult to detect. Most explosives capable of significantly damaging an aircraft weigh at least a pound and are sufficiently large in length, width, and height so as to be readily detectable by an X-ray scanner system regardless of the explosive's orientation within the baggage. However, a plastic explosive powerful enough to damage an aircraft may be formed into a relatively thin sheet that is extremely small in one dimension and is relatively large in the other two dimensions. The detection of plastic explosives may be difficult because it may be difficult to see the explosive material in the image, particularly when the material is disposed so that the thin sheet is parallel to the direction of the X-ray beam as the sheet passes through the system.

Thus, detection of suspected baggage requires very attentive operators. The requirement for such attentiveness can result in greater operator fatigue, and fatigue as well as any distractions can result in a suspected bag passing through the system undetected.

Accordingly, a great deal of effort has been made to design a better baggage scanner. Such designs, for example, have been described in U.S. Pat. No. 4,759,047 (Donges et al.); U.S. Pat. No. 4,884,289 (Glockmann et al.); U.S. Pat. No. 5,132,988 (Tsutsui et al.); U.S. Pat. No. 5,182,764 (Peschmann et al.); U.S. Pat. No. 5,247,561 (Kotowski); U.S. Pat. No. 5,319,547 (Krug et al.); U.S. Pat. No. 5,367,552 (Peschmann et al.); U.S. Pat. No. 5,490,218 (Krug et al.) and German Offenlegungsschrift DE 31 503 06 A1 (Heimann GmbH).

At least one of these designs, described in U.S. Pat. No. 5,182,764 (Peschmann et al.) and U.S. Pat. No. 5,367,552 (Peschmann et al.) (hereinafter the '764 and '552 Patents), has been commercially developed and is referred hereinafter as the "In Vision Machine". The In Vision Machine includes a CT scanner of the third generation type. Such systems have been widely used in the medical imaging arts.

CT scanners of the third generation type typically include an X-ray source and an X-ray detector system secured respectively to diametrically opposite sides of an annular-shaped platform or disk. The disk is rotatably mounted within a gantry support so that in operation the disk continuously rotates about a rotation axis while X-rays pass from the source through an object positioned within the opening of the disk to the detector system.

The detector system includes a linear array of detectors disposed as a single row in the shape of a circular arc having a center of curvature at the focal spot of the X-ray source (i.e., the point within the X-ray source from which the X-rays emanate). The X-ray source generates a fan shaped beam, or fan beam, of X-rays that emanates from the focal spot, passes through a planar imaging field, and is received by the detectors. As is well known, a coordinate system is defined by X-, Y- and Z-axes, wherein the axes intersect and are all normal to one another at the "isocenter" (the center of rotation of the disk as the disk rotates about the rotation axis). The Z-axis is defined by the rotation axis and the X- and Y-axes are defined by and lie within the planar imaging field. The fan beam is thus defined as the volume of space defined between a point source (i.e., the focal spot) and the receiving surfaces of the detectors of the detector array exposed to the X-ray beam. Because the dimension of the receiving surfaces of the linear array of detectors is relatively small in the Z-axis direction the fan beam is relatively thin in that direction. Each detector generates an output signal representative of the intensity of the X-rays incident on that detector. Since the X-rays are partially attenuated by all the mass in their path, the output signal generated by each detector is representative of the density of all the mass disposed in the imaging field between the X-ray source and that detector.

As the disk rotates, the detector array is periodically sampled, and for each measuring interval each of the detectors in the detector array generates an output signal representative of the density of a portion of the object being scanned during that interval. The collection of all of the output signals generated by all the detectors in a single row of the detector array for any measuring interval is referred to as a "projection", and the angular orientation of the disk (and the corresponding angular orientations of the X-ray source and the detector array) during generation of a projection is referred to as the "projection angle". At each projection angle, the path of the X-rays from the focal spot to each detector, called a "ray", increases in cross section from a point source to the receiving surface area of the detector, and thus is thought to "magnify" the density measurement because the receiving surface area of the detector area is larger than any cross sectional area of the object through which the ray passes. As the disk rotates around the object being scanned, the scanner generates a plurality of projections at a corresponding plurality of projection angles. Using well known algorithms a CT image of the object may be generated from all the projection data collected at each of the projection angles. The CT image is representative of the density of a two dimensional "slice" of the object, through which the fan beam has passed during the rotation of the disk through the various projection angles. The resolution of the CT image is determined in part by the width of the receiving surface area of each detector in the plane of the fan beam, the width of the detector being defined herein as the dimension measured in the same direction as the width of the fan beam, while the "length" of the detector is defined herein as the dimension measured in a direction normal to the fan beam parallel to the rotation or Z-axis of the scanner. Such CT scanners are particularly useful in the medical arts because they are capable of generating highly accurate, high resolution images.

However, one important design criteria for a baggage scanner is the speed with which the scanner can scan an item of baggage. To be of practical utility in any major airport, a baggage scanner should be capable of scanning a large number of bags at a very fast rate, e.g., on the order of three-hundred bags per hour or faster, and to provide this rate the scanner must scan an average sized bag at a rate of about 12 seconds per bag or less. For this reason one problem with the In Vision Machine is that CT scanners of the type described in the '764 and '552 Patents take a relatively long time, e.g., from about 0.6 to about 2.0 seconds for one revolution of the disk, to generate the data for a single sliced CT image. Further, the thinner the slice of the beam through the bag for each image the better the resolution of the image, so the CT scanner should provide images of sufficient resolution to detect plastic explosives on the order of only a few mms thick. If 0.6 to 2.0 seconds are required for generation of data for each sliced CT image, and the average bag can be assumed to be about 70 cm long, at the desired throughput rate of 300 bags per hour a conventional CT baggage scanner can only afford to generate an average of six or seven CT images per bag since the bag must be moved and stopped at each location of a scan. Clearly, one cannot scan the entire bag within the time allotted for a reasonably fast throughput. Generating only six or seven, or more, CT images per baggage item leaves most of the item un-scanned and therefore does not provide adequate or complete scanning. The solution to this problem proposed in the '764 and '552 Patents is to provide a prescreening process. The prescreening process is accomplished by using a line scanner. The line scanner identifies up to six or seven, or more, suspect areas. The bag is then moved into the CT scanner where it is stopped for each scan of a suspected area, and then moved into position for the next scan. In this manner the system scans each baggage item relatively quickly since time consuming CT scans are only generated for suspect regions and not the entire baggage item. However, this system is disadvantageous precisely because it does not perform CT scans over the entire baggage item and therefore does not provide adequate scanning. It is clear that the accuracy of this system is limited by the accuracy of the prescreening process, and thus, if the prescreening process has an 80% probability of finding a plastic explosive, then the system has, at best, an 80% probability of success.

Another problem with the In Vision Machine relates to the tradeoff between image resolution and speed of the machine. The thinner the slice of the scan and/or the smaller the width of each detector the better the resolution of the resulting image, but less volume of the bag is scanned. One suggestion in the '764 and '552 Patents is to take "approximately between 5 to 200 continuous CT scans", and generate data which is "displayed to an operator as a pseudo three dimensional image". See for example, col. 5, lines 54–56 of the '764 Patent. However, taking such a volumetric scan, dramatically increases the time required to scan each bag, severely decreasing the throughput of the system.

FIGS. 1 and 2 illustrate the difficulty of detecting thin sheets of plastic explosives, or sheet explosives, with a CT scanner of the type described for use in the In Vision Machine. FIG. 1 shows a diagram of an X-ray source 1 and a detector array 3 with a thin sheet explosive 5 disposed between source 1 and detector array 3. The sheet explosive 5 is assumed to be enclosed within an item of baggage (not shown) that is disposed between X-ray source 1 and detector array 3 with the large flat surfaces of the sheet substantially parallel to the plane of the beam. X-ray source 1 generates a cone beam 7 of X-rays that pass through the baggage and sheet explosive 5 and are received by detector array 3.

FIG. 2 shows a view of a portion of detector array 3 taken along line 2—2 of FIG. 1, and also shows the projection of sheet explosive 5 onto detector array 3. Detector array 3 is shown including a row of individual detectors 12. Due to its narrow thickness and orientation, the projection of sheet explosive 5 only covers a relatively small portion of any single one of the detectors 12. Since each detector 12 generates an output signal representative of the average density of all the mass disposed between itself and the X-ray source, none of the detectors 12 will have a strong response to the presence of sheet explosive 5. Rather, the high density of sheet explosive 5 is effectively averaged with the much lower densities of the other items (not shown) in the immediate proximity of explosive 5, and the presence of sheet explosive 5 affects only a small component of any one of the output signals generated by detectors 12. So the baggage scanner will not reliably detect the presence of sheet explosive 5.

One way to compensate for this deficiency, as mentioned above, is to reduce the thickness of the fan beam decreasing the length of each detector (12) or reduce the width of each detector 12 so as to increase the resolution of the reconstructed CT image. However, this solution only increases the number of scans (in the case of making the fan beam thinner) or increases the number of projections per scan (in the case of making each detector width smaller) required to scan the entire bag which would increase the amount of time required for each bag. In the In Vision Machine, where only select portions of each bag are scanned, better resolution provided by the CT scanner would not necessarily increase the probability of detecting sheet explosives, since such probability is largely dependent of the prescreening process identifying the correct area for a subsequent CT scan of the suspect area.

OBJECT OF THE INVENTION

It is an object of the present invention to substantially reduce or overcome the above-identified problems of the prior art.

Another object of the present invention is to provide an improved baggage scanner for scanning bags at a relatively fast rate, i.e., on the order of 250 to 300 bags or faster.

And another object of the present invention is to provide an improved baggage scanner for scanning bags continuously without the need for operator monitoring as the bags are transported through the scanner.

Yet another object of the present invention is to provide an improved baggage scanner without the need for a prescreening process.

Still another object of the present invention is to provide an improved baggage scanner for detecting objects, such as sheet explosives, with a greater probability, and therefore reliability, than provided by the In Vision Machine.

And yet another object of the present invention is to provide an improved baggage scanner which utilizes a single stage CT scanning process to scan for specific objects having predetermined detectable signatures.

And still another object of the present invention is to provide a detector array for use in a CT baggage scanner that is capable of reliably detecting the presence of thin objects, such as sheet explosives, in baggage while the baggage is transported through the scanner at a relatively high rate.

And yet another object of the present invention is to provide an improved detector array, particularly useful in a CT baggage scanner, for providing a deeper and yet highly resolved field of view in the Z-axis direction than provided, for example, by the CT scanner of the In Vision Machine.

And still another object of the present invention is to provide an improved CT baggage scanner having a two dimensional detector array for providing data useful for example in detecting sheet explosives in bags as they are continuously transported through the scanner.

And yet another object of the present invention is to provide a CT baggage scanner comprising an improved two-dimensional detector array.

And still another object of the present invention is to provide a high speed CT scanner capable of providing image data of a volumetric scan at a relatively fast rate and that is relatively highly resolved in the direction of all three X-, Y- and Z-axes.

And yet another object of the present invention is to provide an improved detector array for use with a CT baggage scanner, the detector array including a first group of detectors used for generating CT images of baggage, and a second group of detectors used for generating sinogram data that is directly interpreted to detect the presence of sheet explosives within the baggage.

And finally another object of the present invention is to provide an improved method of scanning objects as they move through a CT scanner using both image and sinogram data.

SUMMARY OF THE INVENTION

These and other objects are provided by an improved baggage scanner capable of scanning bags at a relatively fast rate, i.e., on the order of 250 to 300 bags or faster, without the need of operator monitoring as the bags are transported through the scanner, or the necessity of a prescreening process. The baggage scanner utilizes a single stage CT scanning process to scan for specific objects having predetermined detectable signatures, such as sheet explosives. The scanner utilizes a two-dimensional detector array including a plurality of detectors in both the X-axis and Y-axis direction and a plurality of detectors in the Z-axis direction for providing a greater and highly resolved field of view in a three-dimensional, volumetric field and for generating data as objects are transported through the scanner.

In one preferred embodiment, the detector array includes two different types of detectors, one for providing greater resolution in the X- and Y-axis directions, and the other for providing greater resolution in the Z-axis direction. Preferably, the first group of detectors is used for generating CT images of the bags as they pass through the scanner, and the second group of detectors is used for generating sinogram data that is directly interpreted to detect the presence of sheet explosives within the baggage.

In this preferred system, the two sets of detectors are arranged as a two dimensional array, with the array including a plurality of sets of detectors, i.e., tiles, each set including at least one of the first detectors from which data is generated for use in generating a CT image, and at least one of the second detectors from which data is generated for use in generating a sinogram.

For economical and efficiency reasons, the detectors of the first and second type are longer in one direction than in the other. With this arrangement, and where the sinogram data is less critical than the data used to generate the CT image, the detectors of the first type are oriented so that the shorter dimension is oriented in or parallel to the X-Y plane so that greater image resolution by virtue of having a shorter width than its length) is provided by those detectors in that direction, while detectors of second type are oriented so that the shorter dimension is oriented in the Z-axis direction so that greater image resolution (by virtue of having a shorter length than its width) is provided by those detectors in that direction.

In accordance with another aspect, the invention provides an improved method of scanning objects, such as baggage, as they move through a CT scanner using both image and sinogram data.

Still other objects and advantages of the present invention will become readily apparent to those skilled in the art from the following detailed description wherein several embodiments are shown and described, simply by way of illustration of the best mode of the invention. As will be realized, the invention is capable of other and different embodiments, and its several details are capable of modifications in various respects, all without departing from the invention. Accordingly, the drawings and description are to be regarded as illustrative in nature, and not in a restrictive or limiting sense, with the scope of the application being indicated in the claims.

BRIEF DESCRIPTION OF THE DRAWINGS

For a fuller understanding of the nature and objects of the present invention, reference should be had to the following detailed description taken in connection with the acompanying drawings in which the same reference numerals are used to indicate the same or similar parts wherein.

DETAILED DESCRIPTION OF THE DRAWINGS

Figure 3A:
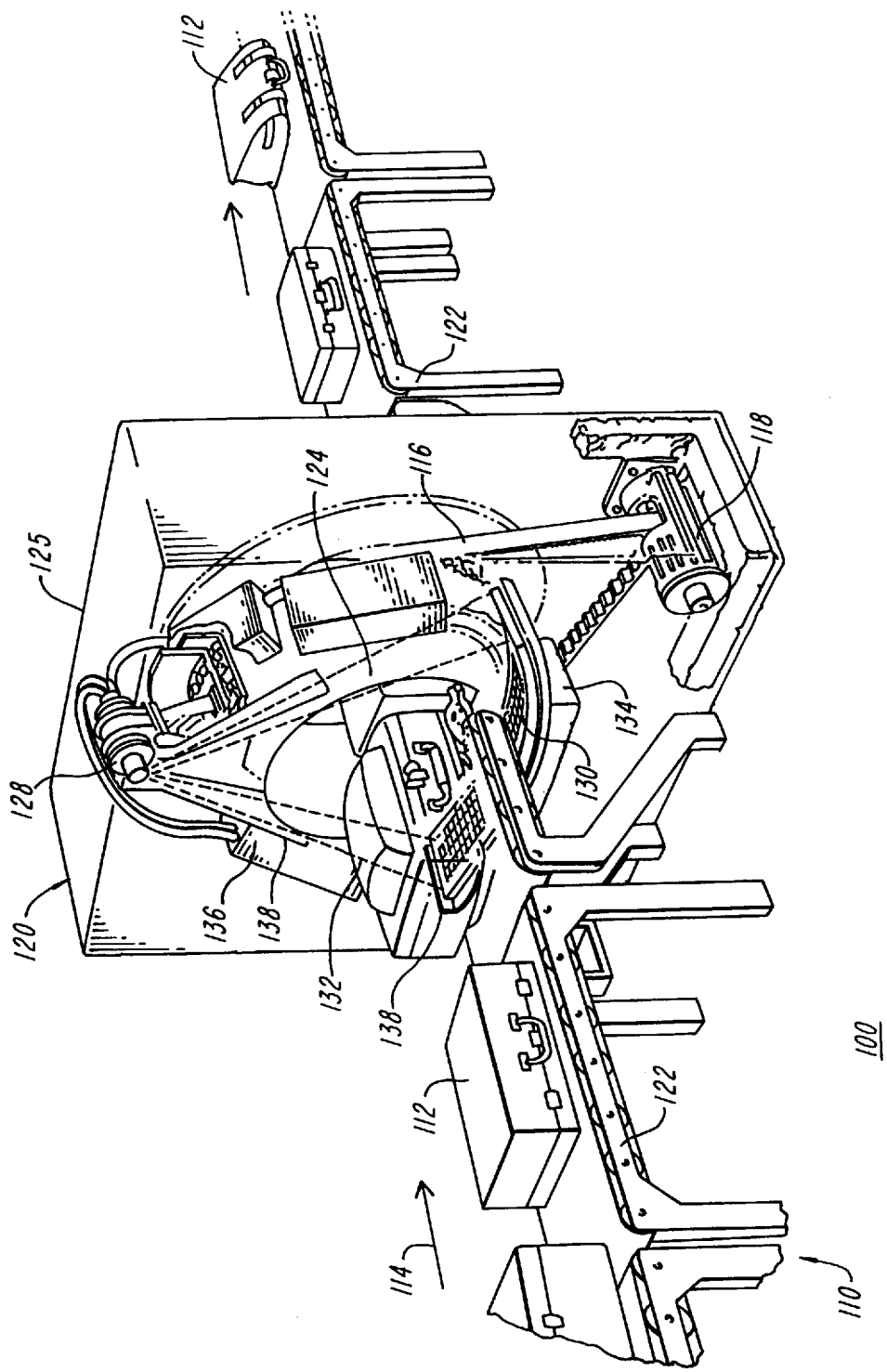
FIGS. 3A, 3B, and 3C show perspective, end cross-sectional and radial cross-sectional views, respectively, of a CT baggage scanning assembly constructed according to the present invention.
Figure 3B:
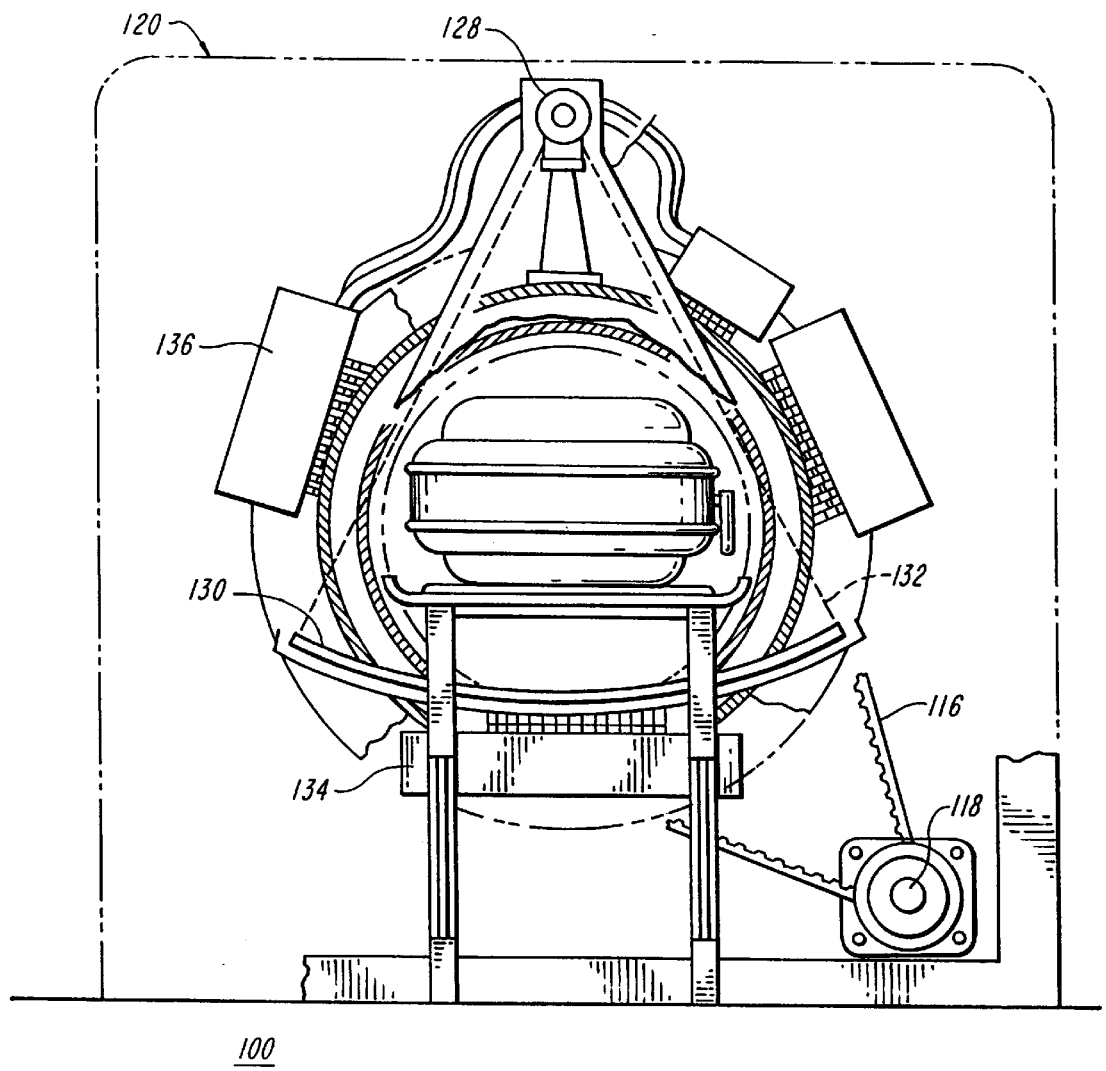
Figure 3C:
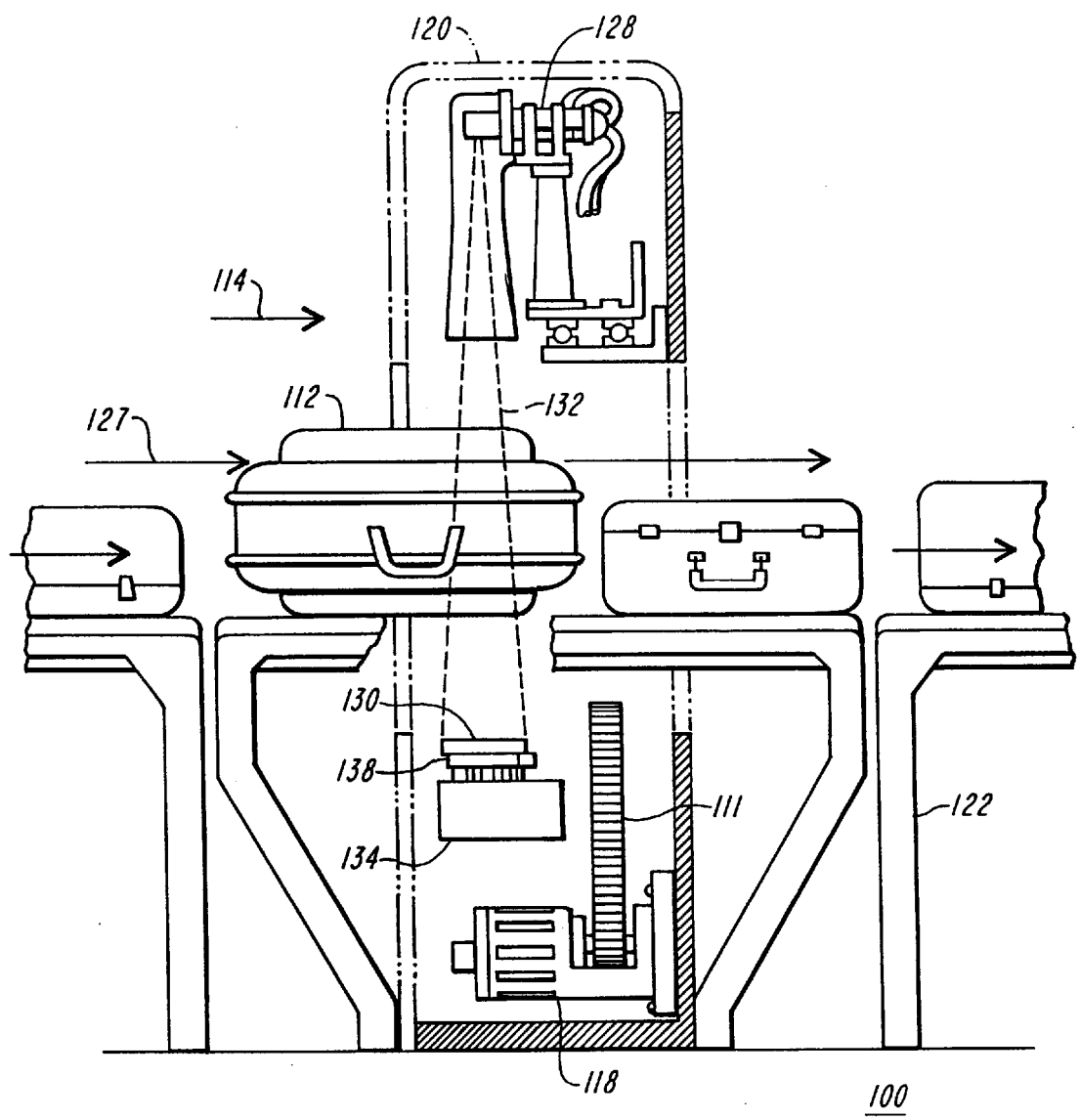

FIGS. 3A, 3B, and 3C show perspective, end cross-sectional and radial cross-sectional views, respectively, of a baggage scanning assembly 100 constructed according to the invention, which as will be discussed in greater detail below provides improved ability to detect the presence of sheet explosives regardless of their orientation, and which also provides rapid and complete CT baggage scanning so that the assembly reliably scans the bags at a relatively high rate with a high probability of detecting sheet explosives. Assembly 100 includes a conveyor system 110 for continuously conveying baggage, or luggage, 112 in a direction indicated by arrow 114 through a central aperture of a CT scanning system 120. Conveyer system 110 is illustrated as including a plurality of individual conveyor sections 122, however, other forms of conveyor systems may of course be used. CT scanning system 120 includes an annular shaped rotating platform, or disk, 124 disposed within a gantry support 125 for rotation about a rotation axis 127 (shown in FIG. 3C) that is preferably parallel to the direction of travel of the baggage 112, which is indicated by arrow 114. Rotating platform 124 defines a central aperture 126 through which conveyor system 110 transports the baggage 112. System 120 includes an X-ray tube 128 and an improved two dimensional detector array 130 which are disposed on diametrically opposite sides of the platform 124. System 120 further includes a data acquisition system 134 for receiving and processing signals generated by detector array 130, and an X-ray tube control system 136 for supplying power to, and otherwise controlling the operation of, X-ray tube 128. The system 120 is also preferably provided with a computerized system (not shown) for processing the output of the data acquisition system 134 and for generating the necessary signals for operating and controlling system 120. The computerized system can also include a monitor 140 for displaying information including generated images. X-ray tube control system 136 is preferably the dual energy x-ray tube control system more fully described in the above-referenced U.S. patent application Ser. No. 08/671,202 since dual energy X-ray techniques for energy-selective reconstruction of X-ray CT images (see, for example, Alvarez, Robin et al., "Energy-selective Reconstructions in X-ray Computerized Tomography", *Phys. Med. Biol.* 1976, Vol. 21, No. 5, 733–744 and U.S. Pat. No. 5,132,998 (Tsutsui)) are particularly useful in indicating a material's atomic number in addition to indicating the material's density, although it is not intended that the present invention be limited to this type control system. System 120 also includes shields 138, which may be fabricated from lead, for example, for preventing radiation from propagating beyond gantry 125.

In operation, X-ray tube 128 generates a pyramidically shaped beam, often referred to as a "cone" beam, 132 of X-rays that pass through a three dimensional imaging field, through which baggage 112 is transported by conveying system 110. After passing through the baggage disposed in the imaging field, cone beam 132 is received by detector array 130 which in turn generates signals representative of the densities of exposed portions of baggage 112. The beam therefore defines a scanning volume of space. Platform 124 rotates about its rotation axis 127, thereby transporting X-ray source 128 and detector array 130 in circular trajectories about baggage 112 as the baggage is continuously transported through central aperture 126 by conveyor system 110 so as to generate a plurality of projections at a corresponding plurality of projection angles. In a well known manner, signals from the detector array 130 can be initially acquired by data acquisition system 134, and subsequently processed by a computerized system (not shown) using CT scanning signal processing techniques. The processed data, as will be described hereinafter, can be displayed on a monitor 140, and/or can also be further analyzed by the computerized system to determine the presence of a suspected material, as for example, reviewing the data to determine whether the data suggests the presence of material having the density (and when a dual energy system is used, molecular weight) of sheet explosives. If such data is present, suitable means can be provided for indicating the detection of such material to the operator or monitor of the system, for example, by providing an indication on the screen of a monitor 140, by sounding an audible or visual alarm, and/or by providing an automatic ejection device for removing the suspect bag from the conveyor for further inspection, or by stopping the conveyor so that the suspect bag can be inspected and/or removed.

Figure 2:
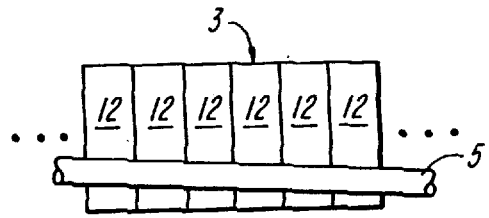
FIG. 2 shows a view taken along line 2—2 of FIG. 1 showing a portion of the prior art detector array shown in FIG. 1 and the projection of the sheet explosive onto the detector array.

As stated above, detector array 130 is a "two dimensional" array of detectors preferably capable of providing scan data in both the directions of the X- and Y-axes, as well as in the Z-axis direction. Whereas prior art detector arrays typically include a linear array of detectors as best shown in FIG. 2 (and therefore can be referred to as "one dimensional" detector arrays), detector array 130 preferably includes a plurality of linear detector arrays, or a plurality of rows of detectors. During each measuring interval, the plurality of detector rows generate data from a corresponding plurality of projections and thereby simultaneously scan a volumetric region of baggage 112. The dimension and number of the detector rows are preferably selected as a function of the desired resolution and throughput of the scanner, which in turn is a function of the rotation rate of rotating platform 124 and the speed of conveying system 110. These parameters are preferably selected so that in the time required for a single complete rotation of platform 124, conveying system 110 advances the baggage 112 just enough so that the volumetric region scanned by detector array 130 during one revolution of the platform is contiguous and non-overlapping with (or partially overlapping with) the volumetric region scanned by detector array 130 during the next revolution of the platform. Conveying system 110 continuously transports a baggage item 112 through CT scanning system 120, preferably at constant speed while platform 124 continuously rotates at a constant rotational rate around the baggage items as they pass through. In this manner, system 120 performs a volumetric CT scan of the entire baggage item. Baggage scanning assembly 100 preferably uses at least some of the data provided by the array 130 and a well known helical reconstruction algorithm to generate a volumetric CT representation of the entire baggage item as it passes through the system. Assembly 100 thus provides a complete CT scan of each bag, rather than only providing CT scanning of selected portions of baggage items as in the In Vision Machine, without the need for a pre-screening device. Assembly 100 also provides rapid scanning since two dimensional detector array 130 allows assembly 100 to simultaneously scan a relatively large portion of each baggage item with each revolution of the platform 124.

Figure 1:
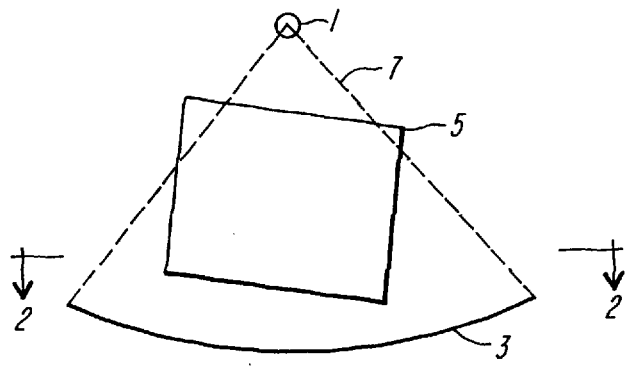
FIG. 1 shows a cross sectional view of a thin sheet of plastic explosive disposed between the X-ray source and the detector array of a CT scanner of a prior art baggage scanner.
Figure 4:
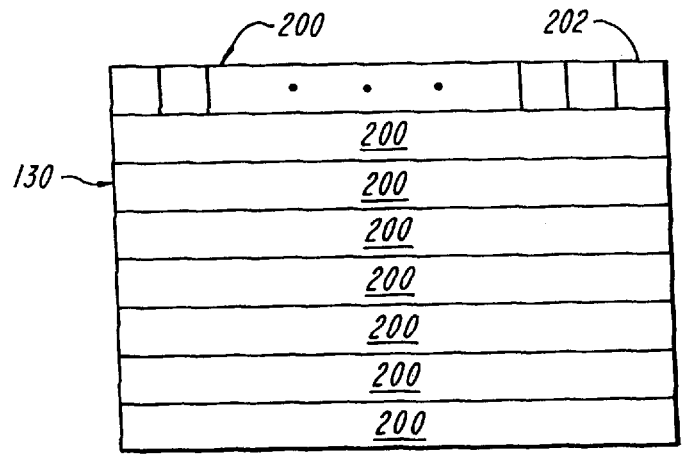
FIG. 4 shows one embodiment of a detector array constructed according to the present invention.

FIG. 4 shows a block diagram of a top view (flattened to provide a planar view) of detector array 130. The detectors 130 (a portion of which are shown in FIG. 4) are arranged in rows and columns so as to provide the two dimensional array. The number and distribution of the detectors is dependent on the design specifications of the system, i.e., the speed of rotation of the platform 124, the desired rate at which baggage is to be provided through the scanner, and the desired resolution of the image created by the data acquired from the two dimension detector array. In this embodiment, detector array 130 includes a plurality of rows 200 (e.g., eight) of detectors 202 distributed in the direction of the Z-axis. Each row preferably has the form of a cylindrical arc disposed in a plane coplanar with or parallel to the X-Y plane so that the array has the form of a cylindrical section, similar to the array illustrated in FIGS. 8, 9, and 10 described hereinafter, preferably having its axis of revolution passing through the focal spot of the X-ray tube, parallel to the Z-axis. By providing multiple rows, the assembly is capable of performing rapid and complete CT scans of entire items of baggage. Such a two dimensional detector array, and others, are generally described in U.S. Pat. No. 5,510,662, issued to Hui Hu et al. and U.S. Pat. No. 5,262,946 issued to Heuscher, each for use in making volumetric scans for medical CT applications. However, the ability for this two dimensional detector array 130 to detect the presence of thin sheet explosives may be accomplished by further reducing the size of the individual detectors 202 at least in one dimension so as to increase the resolution and therefore overcome the problem described above with respect to FIGS. 1 and 2, or by using the density discrimination technique, both described in greater detail hereinafter. For example, in the embodiment illustrated in FIG. 4, the receiving surface of each detector 202 is square so as to provide substantially the same resolution in both directions. Alternatively, each detector can be made longer in the dimension parallel to the Z-axis (having a narrower width than length) so as to provide greater resolution in the directions of the X- and Y-axes, or conversely longer in the dimension in the X-Y plane (having a narrower length than width) so as to provide greater resolution in the direction of the Z-axis. In this case it is desirable to make the longer dimension of the detector (the direction of which is parallel to the Z-axis) smaller than the prior art detectors in order to overcome the problem described above in connection with FIGS. 1 and 2. In order to maintain the desired baggage throughput, additional rows 200 of detectors may be included so that the detector array provides improved resolution in the Z-axis direction.

Thus, it should be recognized that the better the desired resolution, assuming the distance between the focal spot and each detector remains the same, the smaller each detector must be. Reducing the size of each detector to increase the resolution, however, means that a smaller volume is scanned. Therefore, in order to maintain a certain baggage throughput, for a given rotation rate of the platform and speed at which the bags are transported through the system, the system design would require an increase in the number of rows of detectors in order to scan the same volume with each revolution of the platform. Accordingly, in accordance with one aspect of the present invention, the detector array includes two types of detectors, one for providing the desired resolution in the directions of or parallel to the X- and Y-axes, and the other for providing the desired resolution in the Z-axis direction. Therefore, in accordance with another aspect of the present invention, the detector array preferably comprises detectors which are longer in one direction (the major axis) than in another (the minor axis). One set can be oriented generally one way relative to the X- and Y-axes with better resolution in the direction of the X- and Y-axes and thus better resolution in the X-Y plane. These detectors preferably are used to generate CT image data from which a CT image can be generated. The other set can be oriented generally in another direction so as to provide better resolution in the direction of the Z-axis. These detectors preferably are used to generate one or more sinograms in the Z-axis direction. All of the detectors can be identical for economical reasons, or of different types and/or dimensions, with the detectors of the first set being oriented so that the shorter dimension extends in a direction co-incident with or parallel to the plane defined by the X- and Y-axes, while the detectors of the second set are oriented so that the shorter dimension extends in a direction parallel to the direction of the Z-axis.

Figure 5:
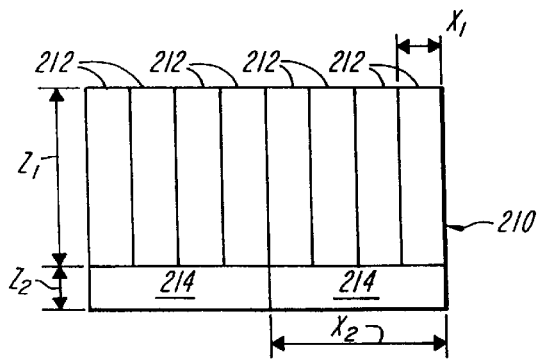
FIG. 5 shows another embodiment of a detector array constructed according to the present invention in the form of a tile.

In accordance with another aspect of the present invention, the two dimensional-array of detectors is preferably formed by an array of detector tiles, each tile comprising a predefined arrangement of detectors including at least one of each type of detector. FIG. 5 shows a block diagram of a preferred embodiment of a detector tile 210 constructed according to one aspect of the invention (again flattened to provide a planar view). Each of the CT detectors 212, for providing data from which a CT image can be reconstructed, is preferably characterized by a rectangular shape having a width $x_1$ and a length $z_1$, the length $z_1$ being substantially greater than the width $x_1$ so that the longer dimension of each CT detector 212 extends along its length and the shorter dimension of each CT detector 212 extends along its width. Each of the Z-axis detectors 214, for generating data from which a sinogram can be generated, is preferably characterized by a rectangular shape having width $x_2$ and length $z_2$, the width $x_2$ being substantially greater than the length $z_2$ so that the longer dimension of each Z-axis detector 214 extends along its width and the shorter dimension of each Z-axis detector extends along its length. Preferably, although not necessarily, the detectors 212 and 214 are identical in size, with $x_1=z_2$, $z_1=x_2$, $4x_1=x_2$ and $4z_2=z_1$. Each tile 210 preferably includes CT detectors 212 and Z-axis detectors 214, all being packed closely together so that there is minimal or no space between them and so that the direction of the longer dimensions of the CT detectors 212 are substantially perpendicular to the direction of the longer dimensions of the Z-axis detectors 214. The CT detectors 212 of each tile 210 are preferably stacked one next to another to form a rectangularly shaped group of eight detectors having a width substantially equal to eight times $x_1$ and a length substantially equal to $z_1$. The two Z-axis detectors 214 are stacked side by side, and abut the CT detectors 212 so that detector tile 210 has a rectangular shape with a width substantially equal to eight times $x_1$ and a length substantially equal to $z_1$ plus $z_2$.

The actual size of each detector in the direction of the best desired resolution is dependent on the thinnest sheet of explosives that one wishes to detect. In one preferred embodiment, the CT detectors are not identical to the Z-axis detectors and $x_1$ is equal to about 5.28 mm, $z_1$ is equal to about 13.38 mm, $x_2$ is equal to about 21.12 mm, and $z_2$ is equal to about 6 mm, although those skilled in the art will appreciate that there is a relatively large degree of flexibility in the choice of these dimensions depending in part on the desired resolution in both directions. It will be appreciated that the direction of the shorter dimension (width) of detectors 212 will be in the direction disposed in or parallel to the plane defined by the X- and Y-axes and therefore define better resolution in that direction, while the direction of the shorter dimension (length) of detectors 214 will in the direction be disposed parallel to the direction of the Z-axis, and therefore define better resolution in that direction.

In the illustrated embodiment, each detector tile 210 includes ten detectors: eight CT detectors 212 and two Z-axis detectors 214.

Each of the detectors 212, 214 in detector tile 210 may be implemented using any of the well known X-ray detector technologies. In one preferred embodiment, detectors 212, 214 are implemented using solid state cadmium tungstate scintillator-silicon photodiode type detectors. However in alternative embodiments, the detector tile 210 may be implemented using other types of scintillators, gas tube Xenon (Xe) detectors, charge coupled device (CCD) based detectors, area detectors (such as those fabricated using amorphous selenium) which include an area of material and which generate an output signal that provides positional information for resolving the location of incident X-rays on that material, or any form of detector that defines a detecting area and generates an output signal representative of the intensity of the X-rays incident on that area.

Figure 6:
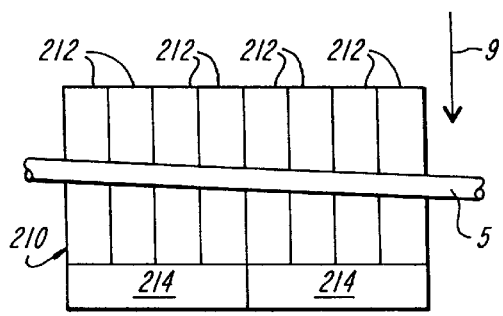
FIGS. 6 and 7 show the projection of a sheet explosive onto portions of the detector tile shown in FIG. 5, as the thin sheet explosive is transported past the detector tile.
Figure 7:
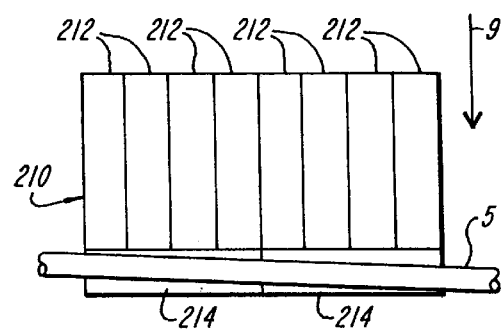

FIG. 6 illustrates the projection of sheet explosive 5 onto detector tile 210 assuming that the thin sheet explosive 5 is contained in an item of baggage (not shown) that is disposed between detector tile 210 and an X-ray source (not shown). Due to the orientation and narrow thickness of sheet explosive 5, its projection only covers a relatively small portion of each of the CT detectors 212. As with the prior art detector array 3 shown in FIG. 2, CT detectors 212 will not have a strong response to the presence of sheet explosive 5. However, as the sheet explosive is transported by conveyor system 110 (shown in FIG. 3A) past detector tile 210 in a direction indicated by arrow 9, sheet explosive 5 will eventually be disposed between the X-ray source and the Z-axis detectors 214. FIG. 7 illustrates the projection of sheet explosive 5 onto Z-axis detectors 214, and since the projection covers a relatively large portion of the Z-axis detectors 214, these detectors will have a relatively strong response to the presence of sheet explosive 5. Since the direction of the shorter dimensions of the Z-axis detectors in tile 210 are perpendicular to the direction of shorter dimensions of the CT detectors, at least some, if not all, of the detectors in tile 210 will have a strong response to the presence of a sheet explosive regardless of its orientation.

While FIGS. 5–7 illustrate a preferred embodiment of detector tile 210, those skilled in the art will appreciate that the invention embraces many variations of the illustrated embodiment of tile 210. For example, detector tiles could be constructed according to the invention that include twelve CT detectors and two Z-axis detectors, or as another example, four CT detectors and one Z-axis detector. Still further, any arrangement of detectors in which the direction of the shorter dimension of one of the detectors is oriented perpendicular, or at least non-parallel, to the direction of the shorter dimension of another detector is embraced within the invention. Also, while in the illustrated embodiment the detector tile has a rectangular shape (which as will be discussed in greater detail below is convenient for using the tile to construct larger detector arrays), detector tiles may be constructed according to the invention having other shapes, such as square shapes, circular shapes, triangular shapes, hexagonal shapes, or irregular shapes.

Figure 8:
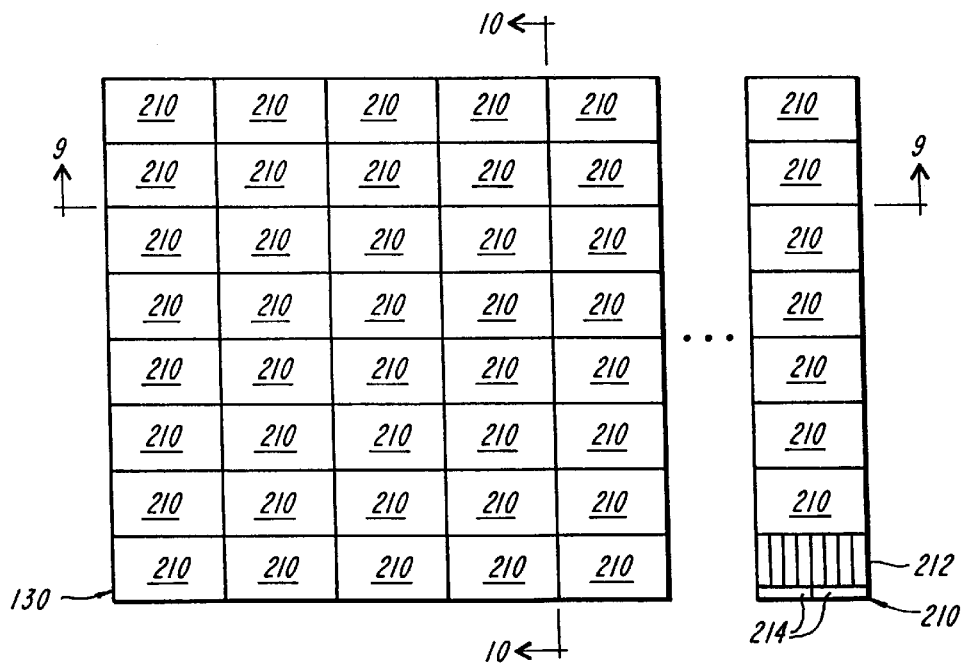
FIG. 8 shows a preferred embodiment of a two dimensional detector array comprising a plurality of tiles of the type shown in FIG. 5.

FIG. 8 shows a block diagram of a top view (flattened to provide a planar view) of a preferred embodiment of detector array 130. In the illustrated embodiment, detector array 130 is configured as a two dimensional array of detector tiles 210 including eight rows of detector tiles 210, and each row including thirty-two detector tiles 210. Each detector tile 210 in array 130 is subdivided into CT detectors 212 and Z-axis detectors 214 as shown by the lower right tile in FIG. 8. It will be appreciated that when properly positioned with all of the tiles in place, where each tile includes a row of eight CT detectors 212 and a row of two Z-axis detectors 214, the tile array shown and described with respect to FIG. 8 will provide a total of 16 alternate rows of 256 CT detectors and 64 Z-axis detectors. With eight rows of tiles, a total of 2048 CT detectors and 512 Z-axis detectors are provided. Alternative embodiments of detector array 130 may of course also include different numbers of rows of tiles (e.g., twelve rows), as well as different numbers of tiles per row (e.g., forty-eight, or sixty-four).

Figure 9:
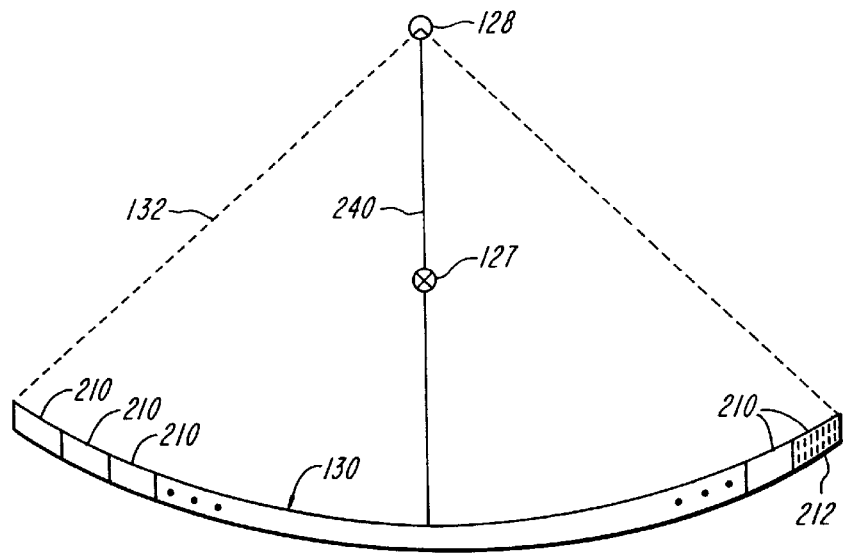
FIG. 9 shows a sectional view taken along line 9—9 of FIG. 8 in the Z-axis direction showing the detector array shown in FIG. 8 and additionally showing the X-ray tube.
Figure 10:
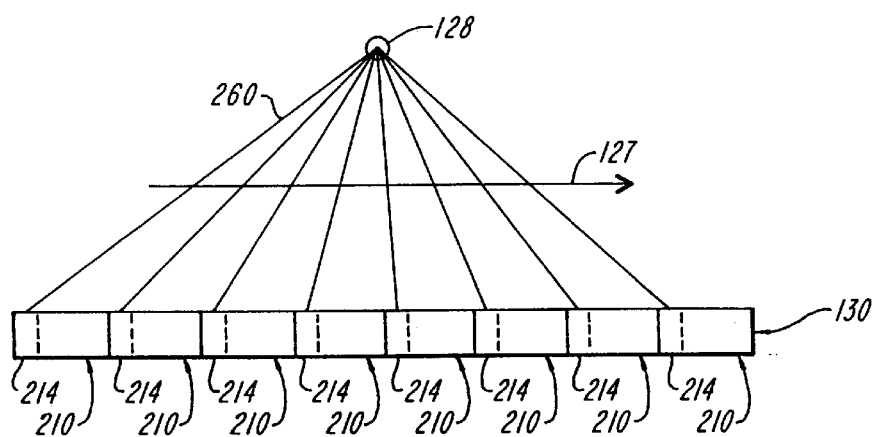
FIG. 10 shows a sectional view taken along line 10—10 of FIG. 8 in the X-axis direction showing the detector array shown in FIG. 8 and additionally showing the X-ray tube.

FIG. 9 shows a cross sectional view taken along line 9—9 of FIG. 8 in the Z-axis direction showing detector array 130 as well as the spatial relationship between detector array 130, X-ray tube 128, cone beam 132, and rotation axis 127 (which is normal to the plane of FIG. 9) when detector array 130 is mounted within baggage scanning assembly 100 (shown in FIGS. 3A–C). FIG. 10 shows a cross sectional view taken along line 10—10 of FIG. 8 in the X-axis direction showing detector array 130 as well as X-ray tube 128 and rotation axis 127. As shown by FIGS. 9 and 10, detector array 130 is preferably configured as a cylindrical section having a center of curvature at the focal spot of the X-ray tube 128, and a radius of curvature equal the length of a line 240 which extends from the focal spot of X-ray tube 128 through rotation axis 127 to detector array 130 and is normal to detector array 130 at the point of intersection with array 130. The detector tiles 210 in array 130 are oriented as shown in FIG. 8 all in the same direction as shown for the lower right tile 210 so that the direction of the shorter dimension (width) of each of the CT detectors 212 is in the same direction as or parallel to the X-Y plane, and the direction of the shorter dimension (length) of each of the Z-axis detectors 214 is parallel to the Z-axis. This orientation insures that the Z-axis detectors will have a relatively strong response to the presence of any sheet explosives that are perpendicular, or nearly perpendicular, to the rotation axis when minimum detection is achieved by the CT detectors.

Preferably, at any one instant of time, the Z-axis detectors 214 in each detector row are particularly well suited for detecting the presence of a sheet explosive having a particular orientation slightly different from the other rows. For example, the Z-axis detectors 214 in the left most detector row as shown in FIG. 10 (which are the same Z-axis detectors in the bottom row of detector tiles 210 as shown in FIG. 8) are particularly well suited for insuring the detection of the presence of sheet explosives that are parallel to plane 260 which extends from the focal spot of X-ray tube 128 to the Z-axis detectors 214 in that row. FIG. 10 shows eight planes (each of the planes being illustrated in cross section by a line) extending from X-ray tube 128 to detector array 130, one plane for each of the eight detector rows, and the Z-axis detectors in each row are particularly well suited for detecting the presence of sheet explosives parallel to their respective plane. The detector array 130 is preferably disposed asymmetrically along the Z-axis direction with respect to a plane defined by the X-and Y-axes and extending normal to the Z-axis through the focal spot of the X-ray tube 128 so that the eight angles made by the intersections of detector array 130 and the eight planes are all unique. Those skilled in the art will appreciate that this helps maximize the information provided by the Z-axis detectors 214. FIGS. 9 and 10 are of course not drawn to scale, and the distance between X-ray tube 128 and detector array 130 is much greater than indicated by the drawing. Therefore, the eight angles formed by the eight planes and the detector array 130 are all relatively close to ninety degrees, and each additional row of Z-axis detectors provides information that is similar to but slightly different from the information provided by the other rows of Z-axis detectors. In alternative embodiments of detector array 130, the rows need not be arranged so that the rows of CT detectors alternate with the Z-axis detectors, nor that the number of rows of CT detectors equals the number of rows of Z-axis detectors. For example, the number of rows of one type of detector can be twice that of the other type of detector, and arranged for example by alternating two rows of the first type with one row of the other type. In another example, all of the rows of one type can be provided as contiguous rows along the direction of the Z-axis, followed by all of the rows of the other type of detector. Further, while the invention has been described in connection with detector tile 210, those skilled in the art will appreciate that the invention may be used to construct many other arrangements of detectors. Exemplary detector arrays embraced within the invention include arrays of detectors arranged in a herring bone pattern, as well as any arrangement of detectors where the direction of the shorter dimension of some of the detectors are perpendicular, or are at least non-parallel, to the direction of the shorter dimension of other detectors in the array. As those skilled in the art will appreciate, orienting the detectors so that the direction of the shorter dimension of some of the detectors are perpendicular, or at least non-parallel, to the direction of the shorter dimension of other detectors in the array compensates for lack of resolution in any of the individual detectors in the direction of the longer dimension, and thereby increases the resolution of the detector array at a reduced cost.

In operation of CT baggage scanning assembly 100 (shown in FIGS. 3A–C), the CT detectors 212 of detector array 130 are preferably used to generate reconstructed CT images of the baggage, whereas the Z-axis detectors 214 preferably do not contribute to the CT images. Rather, the raw data, which is often referred to as the "sinogram" data, generated by the Z-axis detectors 214 is preferably analyzed directly (i.e., without use of a reconstruction algorithm) to detect the presence of sheet explosives that are oriented so that the sheet is perpendicular, or nearly perpendicular, to the direction of the disk's rotation axis 127 (shown in FIG. 3C). Directly analyzing the raw data generated by the Z-axis detectors is preferable because it reduces the number of computations performed by baggage scanning assembly 100 in order to minimize the costs of the assembly. However, in other embodiments the data generated by Z-axis detectors 214 may contribute to the reconstructed CT images as well.

Figure 11B:
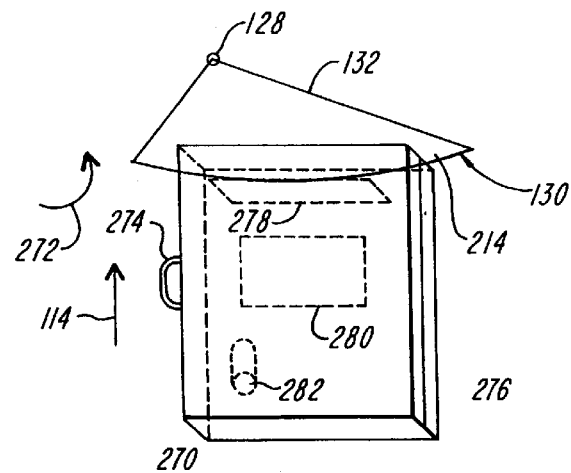
FIG. 11B shows bag that is scanned to generate the sinogram shown in FIG. 11A.
Figure 11A:
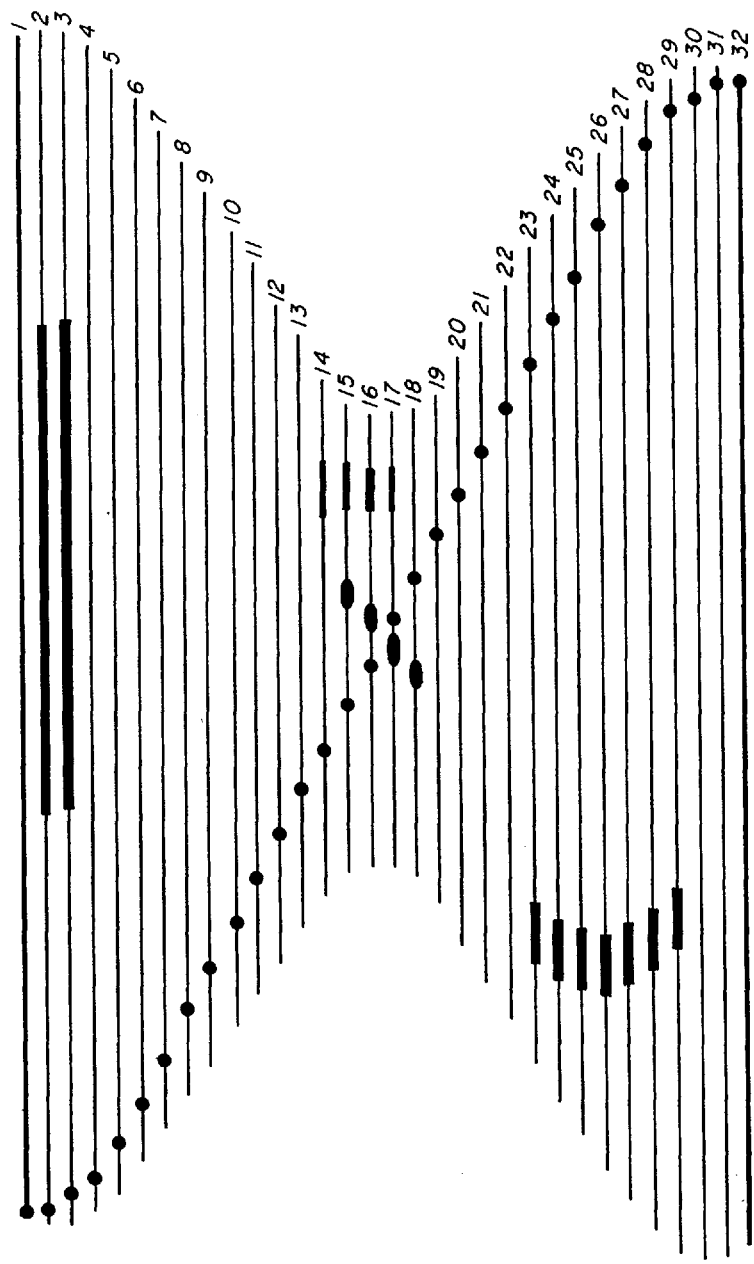
FIG. 11A shows an example of a sinogram constructed from data generated by the Z-axis detectors in one of the rows of detectors in the detector array shown in FIG. 8.

FIG. 11A illustrates a Z-axis sinogram 268 generated by a single row of Z-axis detectors 214 of array 130 while an item of baggage 270 shown in FIG. 11B is transported past X-ray tube 128 and detector array 130 in a direction indicated by arrow 114 while tube 128 and array 130 rotate around bag 270 in a direction indicated by arrow 272. Since the illustrated detector array 130 includes eight rows of Z-axis detectors, baggage scanning assembly 100 simultaneously generates eight such Z-axis sinograms, however, for convenience only sinogram 268 will now be discussed. (The CT detectors of array 130 also of course generate sinogram data, and this data is preferably used by a reconstruction algorithm to generate CT images or at least the data is preferably analyzed on that basis.) Bag 270 has the shape of a rectangular solid and includes a handle 274 and a metal hinge 276 that extends along the side of the bag 270 opposite handle 274. A sheet explosive 278 which is oriented perpendicularly to the rotation axis (not shown) is located in the forward portion of bag 270, and a smaller sheet explosive 280 which is oriented parallel to the rotation axis is located near the center of the bag 270, and a cylindrical object 282 is located near the rear of the bag 270.

Each horizontal row, or "scan line", of sinogram 268 represents the densities measured by all the Z-axis detectors 214 (in the single row of detectors used to generate the sinogram) for a single projection angle (where, as is known in the art, each density measurement is generated by converting the output signal generated by one of the detectors into a representation of X-ray attenuation), and the thickness of each pixel in a scan line represents the density indicated by one detector's output signal (i.e., the greater the density the thicker the line). For the generation of sinogram 268, it is assumed that detector array 130 and X-ray tube 128 rotate exactly 180° in the direction indicated by arrow 272 of FIG. 11B during the time required for bag 270 to be transported entirely through the imaging plane defined by the intersection of cone beam 132 and the single row of Z-axis detectors 214.

The scan line at the top of sinogram 268 (i.e., scan line one) corresponds to a projection angle of zero degrees and is generated when the forward end of bag 270 is disposed in the imaging plane. This scan line is thicker than most other scan lines because the end of the bag 270 (i.e., the material from which bag 270 is composed) is assumed to be denser than the contents of bag 270. The bottom scan line (i.e., scan line thirty two) corresponds to a projection angle of 180° and is generated when the rear end of bag 270 is disposed in the imaging plane, and therefore, this scan line is also thicker than most other scan lines. While sinogram 268 shows only thirty two scan lines to represent a change of 180° in projection angle, those skilled in the art will appreciate that in operation baggage scanning assembly 100 generates sinograms with many more scan lines, and sinogram 268 is presented merely for convenience of exposition and is generally illustrative of the characteristics of those sinograms. Sinogram 268 has a general "hour glass" shape which corresponds to the rectangular solid shape of bag 270. At projection angles of zero and 180°, detector array 130 measures the "broad side" of bag 270 (e.g., one side of the bag), and bag 270 occludes most if not all of the detectors in the array, so the scan lines for these projection angles are relatively long. Conversely, at a projection angle of 90° detector array 130 measures the "narrow side" of bag 270 (e.g., the top or bottom of the bag), and bag 270 only occludes the central detectors in array 130 and only air is disposed between X-ray tube 128 and the detectors at the edges of the array, so only the center part of the scan line for a projection angle of 90° is visible.

Each element of bag 270 is represented by a different structure in sinogram 268. For example, the enlarged circle, or dot, at the left end of the top scan line corresponds to metal hinge 276 which is denser than the rest of bag 270 and therefore generates an area of increased thickness in the sinogram. This dot appears at the end of the scan line because for a projection angle of zero degrees, the one or more detectors that are occluded by hinge 276 are all at one end of the detector array. The dots corresponding to hinge 276 essentially prescribe a downwardly slanted diagonal line across sinogram 268 so that in the bottom scan line the dot corresponding to hinge 276 falls at the right end of the scan line. As those skilled in the art will appreciate, these dots follow a downwardly slanting trajectory because the detectors that are occluded by hinge 276 shift according to a function of the projection angle.

Sheet explosive 278 is indicated in sinogram 268 by the areas of increased density (or thickness) which span many detectors in scan lines one and two. Sheet explosive 278 is only represented in a few scan lines because the sheet is quickly transported past the imaging plane. In general, sheet explosives that are perpendicular or nearly perpendicular to the rotation axis will present a similar signature in the Z-axis sinogram. They are indicated by an area of increased density that spans several adjacent Z-axis detectors over a relatively small number of adjacent projection angles. Handle 274 is indicated in sinogram 268 by the areas of increased density in scan lines fifteen through eighteen. Sheet explosive 280 is indicated in sinogram 268 by the areas of increased density in scan lines fourteen through eighteen. The signature of sheet explosive 280 is quite different from that of sheet explosive 278 because sheet 280 is nearly parallel to the rotation axis. The Z-axis sinogram data may be analyzed to detect sheets with this orientation (or with other orientations that are not nearly perpendicular to the rotation axis), however, such sheets are more likely to generate a stronger response in the CT detectors and are preferably detected by analyzing the reconstructed CT images. The cylindrical object 282 is indicated in sinogram 268 by the areas of increased density in scan lines twenty-three through twenty-nine.

As illustrated by sinogram 268, since the direction of the shorter dimension of the Z-axis detectors are parallel to the rotation axis, sheet explosives that are oriented perpendicularly to the rotation axis (like sheet explosive 278) will have a strong and characteristic response in the Z-axis sinogram data. Such sheet explosives are indicated in the sinogram by areas of increased density that span several detectors and a few projection angles. As those skilled in the art will appreciate and as suggested above, automated detection algorithms may be used to scan the sinogram data for high density regions indicative of the presence of sheet explosives. In a preferred mode of operation for baggage scanning assembly 100, a processor (not shown) uses such detection algorithms to continually process the sinogram data generated by the Z-axis detectors to determine whether sheet explosives are present in any scanned baggage.

For example, a sheet of plastic explosive has a typical density of about 1.5 gm/cc, within a voxel size (the size of the volume represented by one pixel in a reconstructed CT image) of about 1 cm cubed. This density is still sufficiently large to be discriminated against a background bag density of about 0.2 gm/cc. For plastic explosives, voxels within a chosen range of densities approximate 0.4 to 1.8 cm/cc are of interest. Thus, using standard algorithms to connect the various voxels so as to represent a reconstructed image, the number of voxels in each region can be determined and compared to a predetermined threshold, e.g., 0.4 cm/cc or higher. Regions containing only a small number of voxels over the threshold are rejected as being harmless (since not enough space is prescribed to contain sufficient plastic explosive to do harm). Regions containing more voxels than the preset threshold, e.g. 250 cc, are identified as suspect. The mass contained in such connected regions is then calculated by multiplying the volume in each pixel by its density. If the resulting mass is greater than a preset threshold, the region is tentatively identified as explosive. Verification, as previously described, may then be required. This latter technique allows the use of pixels larger than the sheet thickness. For example, where the threshold is set to detect a density of 0.4 gm/cc or higher, the smaller dimension of the detector is 5 mm, and a sheet of explosive 2 mm thick having a density of 1.5 gm/cc shadows a detector, the detector will provide an output signal of 40% of the actual density, i.e., 0.6 gm/cc, above the threshold. The use of larger pixels than the possible minimal sheet thickness results in significant system complexity reductions. Detector size can be increased and detector number decreased, resulting in substantial savings in detector and electronics cost. Similarly, the reduction in the size of the number of pixels in the reconstructed image results in a significant savings in reconstruction processor and image processing costs, as well as storage requirements.

As discussed in greater detail in the above-referenced U.S. patent application Ser. No. 08/671,202, baggage scanning assembly 100 may advantageously use a dual energy beam of X-rays. In alternate embodiments, the output signals generated by the Z-axis detectors 214 may be sampled only in response to the high energy beam, or only in response to the low energy beam. In still another embodiment, the output signals generated by the Z-axis detectors 214 may be sampled in response to both the low and high energy beams and the data generated in response to the two beams may be processed separately, or alternatively may be combined, for example by averaging, prior to processing the sinogram data to detect the presence of sheet explosives.

As stated above, the dimensions of detector array 130 are preferably selected in accordance with the rotation rate of platform 124 (shown in FIG. 3A) and the desired speed of conveying system 110. In one preferred embodiment platform 124 rotates 360° every two-thirds of a second, detector array 130 includes eight rows of detector tiles 210, and the speed of conveying system 110 is selected so that scanning assembly 100 may process six hundred seventy five averaged sized bags per hour where an average sized bag is approximately seventy centimeters long. In another preferred embodiment, platform 124 rotates 360° every two-thirds of a second, detector array 130 includes twelve rows of detector tiles 210, and the speed of conveying system 110 is selected so that scanning assembly 100 may process nine hundred averaged sized bags per hour.

The invention has been described in connection with baggage scanning assembly 100 and the detection of sheet explosives. However, those skilled in the art will appreciate that the two dimensional detector array of the present invention is useful for all manner of CT based systems including systems for continuously scanning other types of articles such as containers or mail. Two dimensional arrays constructed in accordance with the invention, are particularly effective at detecting the presence of sheet like structures, and the detection of such structures has uses extending beyond the detection of sheets of plastic explosives as described above.

The baggage scanning system thus described is capable of continuously scanning bags at a relatively fast rate, i.e., on the order of 250 to 300 bags per hour or faster, without the need for operator monitoring as the bags are transported through the scanner, and without the need for a prescreening process. It is believed that the scanner is particularly useful in detecting objects, such as sheet explosives, with a greater probability, and therefore reliability, than provided by the In Vision Machine. The scanner utilizes a single stage CT scanning process to scan for specific objects having predetermined detectable signatures, such as sheet explosives, in baggage as the baggage is transported through the scanner at a relatively high rate. The two-dimensional detector array provides a greater and highly resolved field of view in the Z-axis direction than provided, for example, by the CT scanner of the In Vision Machine, and is particularly useful in providing data in detecting thin objects such as sheet explosives in bags as they are continuously transported through the scanner. By providing the detector array with two types of detectors, one for high resolution in the plane of or parallel to the plane of the X- and Y-axes, and the other for high resolution in the direction of the Z-axis, the number of total detectors can be reduced. Further, by using the CT detectors to generate a CT image and the Z-axis detectors to generate one or more sinograms, an economical and yet high resolution system can be designed.

Since certain changes may be made in the above apparatus without departing from the scope of the invention herein involved, it is intended that all matter contained in the above description or shown in the accompanying drawing shall be interpreted in an illustrative and not a limiting sense.

What is claimed is:

1. A scanning assembly for sequentially scanning a plurality of separate objects up to a predetermined throughput rate, said assembly comprising:
   (a) an X-ray source;
   (b) a detector system for receiving X-rays from said X-ray source during a scan, said detector system including a two dimensional array of detectors;
   (c) means for rotating the source and detection system about a rotation axis at a preselected rate of rotation; and
   (d) conveying means for transporting the plurality of objects to be scanned in sequence between said X-ray source and detector system up to said predetermined throughput rate;
   (e) wherein said predetermined throughput rate is a function of the preselected rate of rotation, and the dimension of the two dimensional array of detectors in the direction of said rotation axis so that each object is substantially entirely scanned by said assembly.

2. An assembly according to claim 1, wherein said two dimensional array of detectors comprises a plurality of rows of detectors.

3. An assembly according to claim 1, wherein said two dimension array includes at least two types of detectors, one type of detector for providing relatively high resolution in a direction normal to the rotation axis, and the other type of detector for providing relatively high resolution in a direction parallel to the rotation axis.

4. An assembly according to claim 3, wherein said one type of detector is dimensioned so as to be of shorter width in a direction normal to the rotation axis than in the direction parallel to the rotation axis, and the other type of detector is dimensioned so as to be of shorter length in the direction parallel to the rotation axis than in a direction normal to the rotation axis.

5. An assembly according to claim 4, wherein said two-dimensional array of detectors comprises alternating rows of said one type and said other type of detector.

6. An assembly according to claim 4, wherein each of said one type of detectors generates data for use in creating a CT image, and each of said other type of detectors generates data for use in creating a sinogram.

7. An assembly according to claim 1, wherein the dimension of said array in a direction parallel to the direction of said rotation axis is a function of (a) the rotational speed at which the source and detection system rotate about the rotation axis, and (b) the rate at which the conveying means transports items to be scanned between said rotating X-ray source and detector system such that each item is entirely scanned by said assembly as it is conveyed through said assembly.

8. A detector system for use with a CT scanner of the type including a source of x-rays that rotates with the detector system about a rotation axis during a scan, said detector system comprising a two dimensional array of detectors having at least two groups of detectors, wherein the detectors of one group are oriented to provide greater resolution in a first direction, and the detectors of the other group are oriented to provide greater resolution in a second direction different from the first direction.

9. A detector system according to claim 8, wherein said two dimensional array includes an array of detectors having square-shaped receiving surfaces for receiving X-rays from said source.

10. A detector system according to claim 8, wherein said two dimensional array comprises a plurality of first detectors and a plurality of second detectors, each for detecting X-rays during a scan, said first detectors providing better resolution in a direction within a plane normal to the rotation axis than the resolution in a direction parallel to the rotation axis, and said second detectors for providing better resolution in a direction parallel to the rotation axis than the resolution in a direction within a plane normal to the rotation axis.

11. A detector system according to claim 10, wherein said first detector is dimensioned so as to be longer in a direction parallel to the rotation axis than in the direction in the plane normal to the rotation axis, and the second detector is dimensioned so as to be longer in the plane normal to the rotation axis than in a direction parallel to the rotation axis.

12. A detector system according to claim 11, wherein said two-dimensional array of detectors comprises a plurality of rows of said first and second detectors.

13. A detector system according to claim 12, wherein said two-dimensional array of detectors comprises a plurality of alternating rows of said first and second detectors.

14. A detector system according to claim 12, wherein each of said first detectors generates data for use in creating a CT image, and each of said second detectors generates data for use in creating a sinogram.

15. A detector system according to claim 10, wherein two-dimensional array includes a plurality of detector tiles, each of said tiles comprising at least one of said first detectors and at least one of said second detectors.

16. A detector system according to claim 15, wherein each of said tiles comprises at least two of said first detectors and at least two of said second detectors.

17. A detector system according to claim 16, wherein each of said tiles comprises more of said first detectors than of said second detectors.

18. A detector system according to claim 16, wherein said array of tiles includes a plurality of rows and columns of said tiles so as to form a two dimensional array of said tiles.

19. A detector system for use with a CT scanner for obtaining three-dimensional scans of an object, said detector system comprising:

a two dimensional quadrilateral detector array having a width dimension and a length dimension and comprising at least two pluralities of detectors, wherein the detectors of the first plurality of detectors each is longer in the width dimension than in the length dimension, and the detectors of the second plurality of detectors each is longer in the length dimension than in the width dimension.

20. A system according to claim 19, wherein each detector of said first and second pluralities of detectors is characterized by a substantially rectangular radiation receiving surface.

21. A system according to claim 19, wherein said two dimensional quadrilateral detector array is characterized by the shape of an arcuate section, wherein said first and second pluralities are oriented on said section.

22. A system according to claim 19, wherein said two dimensional quadrilateral detector array is characterized by the shape of a cylindrical section, wherein said first and second pluralities are oriented on said section.

23. A CT system of the type including (a) an X-ray source; (b) a detector system for receiving X-rays from said X-ray source during a scan, and (c) means for rotating the source and detection system about a rotation axis, said detector system including:

(i) at least a first plurality of detectors having a higher resolution in a direction parallel to a plane normal to the rotation axis than parallel to the rotation axis, (ii) at least a second plurality of detectors having a higher resolution in a direction parallel to the rotation axis than parallel to a plane normal to the rotation axis.

24. A system according to claim 23, wherein:

(i) said first plurality of detectors defines at least one first detection area and includes means for generating an output signal representative of an intensity of X-rays incident on said first detection area; and (ii) said second plurality of detectors defines at least a second detection area and includes means for generating an output signal representative of an intensity of X-rays incident on said second detection area.

25. A system according to claim 23, further including conveying means for transporting items to be scanned between said x-ray source and detector system.

26. A system according to claim 25, wherein said conveying means comprises a conveyor belt.

27. A system according to claim 25, wherein said conveying means transports said items in a direction substantially parallel to said rotation axis.

28. A system according to claim 23, wherein each detector in said first and second pluralities of detectors is characterized by a substantially rectangular shape.

29. A system according to claim 23, wherein said detector system is characterized by a shape of a cylindrical section.

30. A system according to claim 23, wherein said detector system includes an array of detector tiles, each of said tiles comprising at least one detector of said first set and one detector of said second set.

31. A system according to claim 30, wherein each of said tiles comprises at least two detectors of said first plurality and at least two detectors of said second plurality.

32. A system according to claim 31, wherein each of said tiles comprises more detectors of said first plurality than of said second plurality.

33. A detector system according to claim 31, wherein said array of tiles includes a plurality of rows and columns of said tiles so as to form a two dimensional array.

* * * * *